United States Patent [19]

Miyano

[11] Patent Number: 5,777,797
[45] Date of Patent: Jul. 7, 1998

[54] OBJECTIVE LENS SYSTEM FOR ENDOSCOPES HAVING AN IMAGE TRANSFER OPTICAL FIBER BUNDLE

[75] Inventor: Hitoshi Miyano, Saitama, Japan

[73] Assignee: Fuji Photo Optical Co., Ltd., Saitama, Japan

[21] Appl. No.: 708,674

[22] Filed: Sep. 5, 1996

[30] Foreign Application Priority Data

Sep. 11, 1995 [JP] Japan .................................. 7-259434

[51] Int. Cl.$^6$ .............................. G02B 21/02; A61B 1/06
[52] U.S. Cl. ........................... 359/660; 359/663; 359/783; 600/176
[58] Field of Search ................................ 600/160, 176, 600/182; 359/660, 663, 770, 781, 783

[56] References Cited

U.S. PATENT DOCUMENTS

| 4,269,485 | 5/1981 | Yamashita et al. ............. 600/167 X |
| 5,424,877 | 6/1995 | Tsuyuki et al. ...................... 359/663 |

*Primary Examiner*—John P. Leubecker
*Attorney, Agent, or Firm*—Young & Thompson

[57] ABSTRACT

An objective lens system for an endoscope having an image transfer optical fiber bundle comprises from the object end a first lens of negative power having a concave image side surface, a second lens of positive power having a radius of curvature greater on an image side than on an object side, a third lens of positive power having a radius of curvature greater on the object side than on the image side, a doublet lens of positive power which comprises a forth lens element and a fifth lens element, and an aperture diaphragm interposed between the second and third lenses and satisfies the following relations:

$$d \cdot f / f_R^2 < 0.11$$

$$v2 < 45.0$$

where f is the equivalent focal length of the entire objective lens system, $f_R$ is the equivalent focal length of the rear lens group including the third, fourth and fifth lens elements, d is the axial distance between the aperture diaphragm and the front focal point of the rear lens group, and v2 is the Abbe number of glass for the second lens.

8 Claims, 3 Drawing Sheets

ND. 5,777,797

OBJECTIVE LENS SYSTEM FOR ENDOSCOPES HAVING AN IMAGE TRANSFER OPTICAL FIBER BUNDLE

BACKGROUND OF THE INVENTION

1. Field of the Invention

This invention relates to an objective lens system for an endoscope of the type having an image transfer optical fiber bundle.

2. Description of Related Art

Because objective lenses for medical and industrial endoscopes are installed within distal end housings of flexible sections which are inserted into internal organs of human bodies or small cavities of material bodies, such an objective lens is designed and structured to be compact and small in size.

One type of endoscopes have solid state imaging devices such as charge coupled devices (CCD) installed within distal end housings of flexible sections on which an optical image is formed by means of an objective lens. One of objective lenses applied to such an endoscope having a solid state imaging device, which is known from, for instance, Japanese Unexamined Patent Publication No. 2-188709, comprises five lens elements L1 through L5 and an aperture diaphragm AP interposed between second and third lens elements L2 and L3 as shown in FIG. 3. This objective lens forms an optical image on a solid state imaging device 12 fixed to an optical element L6, such as a low-pass filter and/or a prism. All of these optical elements are received within a distal end housing of a flexible section of the endoscope.

Another type of endoscopes have image transfer optical fiber bundles extending through flexible sections which transfer an optical image formed on one end surface by an objective lens to another end surface located in close proximity to an eyepiece for observation. The later type endoscopes are advantageous to providing a small-sized distal end. An objective lens applied to such an endoscope of the type incorporating an image transfer optical fiber bundle is designed and adapted in consideration of image transfer characteristics of the optical fiber bundle so as to make principal rays emanate therefrom in parallel to the optical axis of the objective lens.

Because the objective lens taught by the Japanese Unexamined Patent Publication No. 2-188709 has been designed with intention of forming an image on the solid state imaging device 12, it is not expected to make principal rays emanate in parallel to the optical axis and is hardly cooperative with endoscopes of the type having image transfer optical fiber bundles.

SUMMARY OF THE INVENTION

It is, therefore, an object of this invention to provide an objective lens for an endoscope of the type having an image transfer optical fiber bundle.

It is another object of this invention to provide an objective lens for an endoscope which makes principal rays emanate in approximately parallel to the optical axis thereof.

These objects of the invention are achieved by providing an objective lens for an endoscope of the type having an image transfer optical fiber bundle which comprises from the object end to the image end a negative power of first lens element having a concave image side surface, a positive power of second lens element having a radius of curvature greater on an image side than on an object side, a positive power of third lens element having a radius of curvature greater on the object side than on the image side, a positive power of doublet lens element comprising forth lens element and fifth lens element, and an aperture diaphragm interposed between the second and third lens element.

An objective lens system embodying the invention may be designed for various image sizes by satisfying the following relations:

$$|d \cdot f/f_R^2| < 0.11$$

$$v2 < 45.0$$

where f is the equivalent focal length of the entire objective lens system, $f_R$ is the equivalent focal length of the rear lens group including the third, fourth and fifth lens elements, d is the axial distance between the aperture diaphragm and the front focal point of the rear lens group, v2 is the Abbe number of glass for the second lens element.

BRIEF DESCRIPTION OF THE DRAWINGS

The above and other objects and features of the invention will be clearly understood from the following description with respect to a preferred embodiment thereof when considered in conjunction with the accompanying drawings, in which.

DETAILED DESCRIPTION OF THE SPECIFIC EMBODIMENTS

Figure 1:
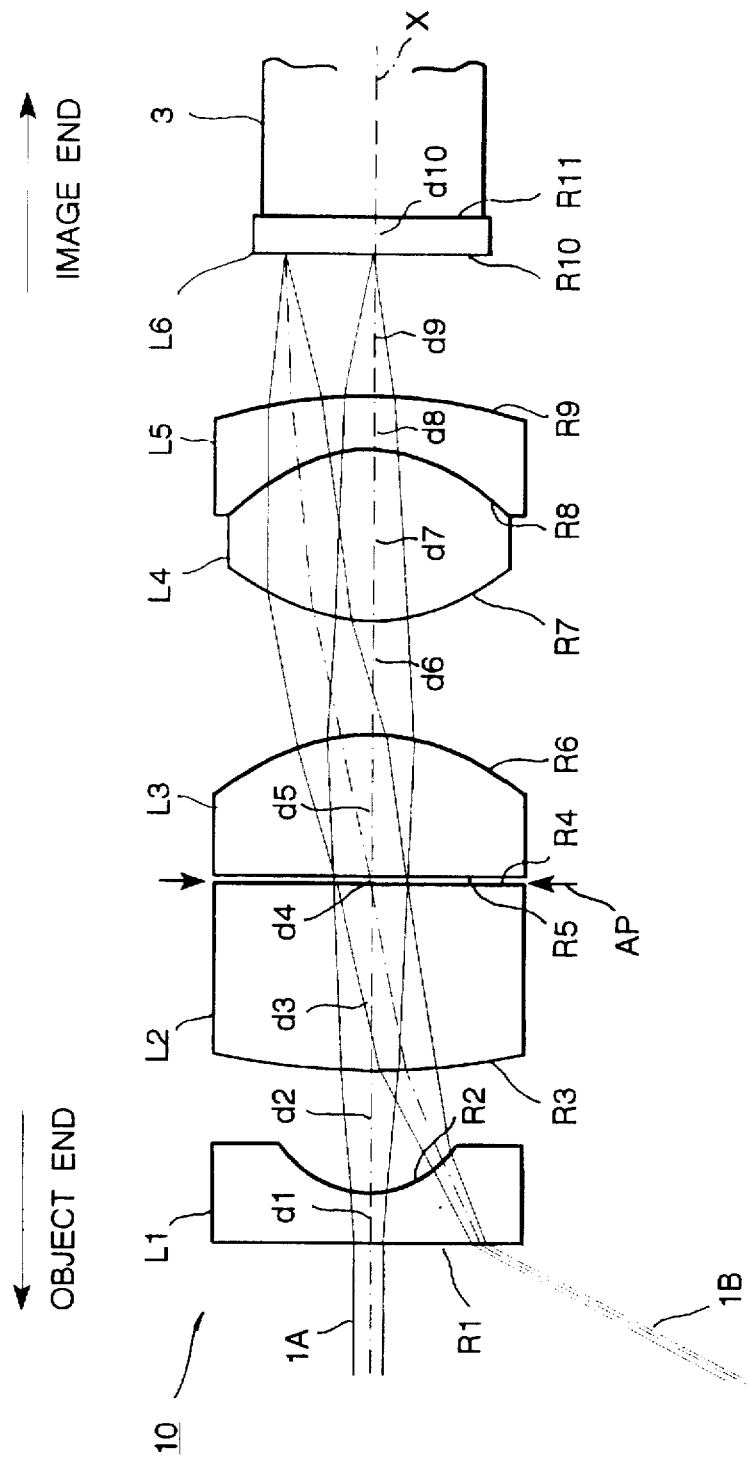
FIG. 1 is a side cross-sectional view of an objective lens system for an endoscope in accordance with an embodiment of the invention.
Figure 2:
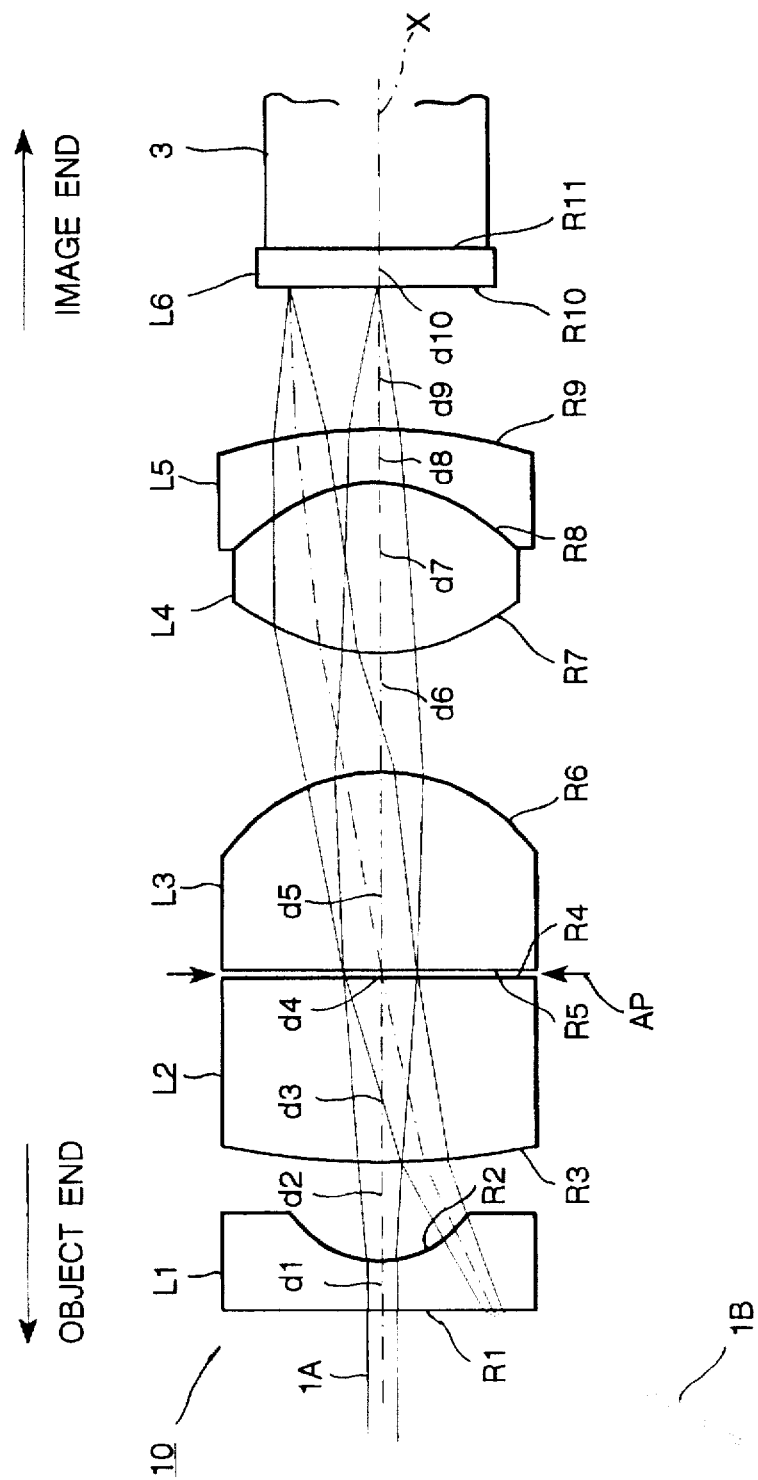
FIG. 2 is a side cross-sectional view of an objective lens system for an endoscope in accordance with another embodiment of the invention.

Referring now to FIGS. 1 and 2 showing objective lenses for an endoscope in accordance with preferred embodiments of the invention, each of the objective lenses comprises an optical lens system 10 including five lens elements L1 and L2 as a front lens group and L3–L5 as a rear lens group and an aperture diaphragm AP interposed between the front and rear lens groups. The objective lens system 10 makes principal rays, such as labeled by 1A and 1B in FIG. 1 or 2, emanate in approximately parallel with the optical axis X and focus an optical image on one end surface of an optical fiber bundle 3 which is covered and protected by a cover glass plate L6. As is well known in the art, since the optical fiber bundle 3 has the same spatial arrangement at both ends, the optical fiber bundle 3 enables an image formed on one end surface to be observed on the other end surface.

The objective lens system 10 includes first to fifth lens elements L1–L5 arranged, in order from the object end toward the image end, at given axial distances, the first lens element L1 being of a plano-concave lens of negative power having a concave image side surface; the second lens element L2 being of a piano-convex lens of positive power having a convex object side surface; the third lens element L3 being of a plano-convex lens of positive power having a convex image side surface; the fourth lens element L4 being of bi-convex lens having a strong curvature of radius on an image side; and the fifth lens element L5 being of a negative power meniscus lens having a convex image side surface. The forth and fifth lenses elements L4 and L5 are cemented together.

The components of objective lens system 10 in all embodiments of the invention must satisfy the following relations (I) and (II):

$$|d \cdot f/f_R^2| < 0.11 \quad (I)$$

$$v2 < 45.0 \quad (II)$$

where f is the equivalent focal length of the entire objective lens system;

$f_R$ is the equivalent focal length of the rear lens group;

d is the axial distance between the aperture diaphragm and the front focal point of the rear lens group;

v2 is the Abbe number of glass for the second lens element.

The condition (I) provides the relationship necessary for a telecentric optical system which enables principal rays to emanate in parallel with the optical axis. Because of light reflection characteristics of optical fibers, principal rays incident on the end surface of the optical fiber bundle 3 must be in parallel with the optical axis X. This requirement implies that the exit pupil is at a long distance. The requirement is met by forming an image of the aperture diaphragm AP formed by the rear lens group, namely third to fifth lens elements L3–L5, at a point far away from the focal plane of the objective lens system 10.

From the above analytical consideration, the first condition (I) is obtained in the following way.

Letting d be the distance from a front focal point of the rear lens group and the aperture diaphragm AP, the distance from a back focal point to a point of an image of the aperture diaphragm AP is as follows:

$$D = f_R^2 / d \quad (1)$$

If there is no distortion at an angle of visual field of 90°, the relationship between the equivalent focal length f of the entire objective lens system 10 and an image height h is given as follows:

$$f = h \quad (2)$$

Because objective lens systems for endoscopes have wide angles of view and, however, produce strong negative distortion, a restriction is imposed on the relationship (2) as follows:

$$0.8 < h/f < 1.0 \quad (3)$$

Regarding that the exit pupil is at the distance D from the back focal point to the point of an image of the aperture diaphragm AP, the incident angle θ of a principal ray for an peripheral image at an image height h is given by the following equation:

$$\tan \theta = -h/D \quad (4)$$

The equation (4) is rewritten as follows:

$$\tan \theta = -h \cdot d/f_R^2 = -(h/f) \cdot (d \cdot f/f_R^2) \quad (5)$$

Regarding that the optical fiber bundle 3 has an effective light transmission angle of approximately 15° on one side of the optical axis and the objective lens system 10 has an f-number (Fno.) of 3.0, the maximum incident angle of central light ray is approximately 10°. Regarding the difference of 5° as the highest permissible angle, the incident angle θ of a principal ray is given by the following equation:

$$\tan \theta = 0.087 \quad (6)$$

That is, tanθ should be less than 0.087.

By substituting the conditions given by the equations (3) and (6) into the equation (5) on condition that the objective lens system may have its exit pupil at a point on either side of the back focal point, the condition (I) is given.

The second parameter (v2<45.0) is necessary for suitably balancing the aberrations, such as longitudinal chromatic aberrations and lateral chromatic aberrations, of the objective lens system. If the limit is exceeded, it is difficult to prevent or significantly reduce aggravation of chromatic aberrations.

The following examples in Tables I and II are exemplary of objective lens systems embodying the invention set forth for a focal length of 1 mm. In the following prescription tables, the reference L followed by an arabic numeral indicates the lens elements progressively from the object end to the image end of the lens system. The reference radius numbers R are the progressive lens surface radii. Positive surface radii are struck from the right of the lens surface on the optical axis X, and negative radii are struck from the left of the lens surface on the optical axis X $n_d$ is the index of refraction of the lens element $v_d$ is the dispersion of the lens element as measured by the Abbe number. The reference distance numbers d are the progressive axial distances between adjacent lens surfaces.

The objective lens system shown in FIG. 1 is substantially described in Table I.

TABLE I

| Element | Radius of Curvature (mm) | Axial Distance Between Surfaces | $n_d$ | $V_d$ |
|---|---|---|---|---|
| L1 | R1 = ∞ | d1 = 0.5363 | 1.81550 | 44.4 |
|  | R2 = 1.155 | d2 = 1.3274 |  |  |
| L2 | R3 = 13.8639 | d3 = 1.9174 | 1.80518 | 25.4 |
|  | R4 = ∞ | d4 = 0.0536 |  |  |
| L3 | R5 = ∞ | d5 = 1.5151 | 1.71300 | 53.9 |
|  | R6 = −2.4590 | d6 = 1.2738 |  |  |
| L4 | R7 = 2.9887 | d7 = 1.6760 | 1.62041 | 60.3 |
| L5 | R8 = −1.9857 | d8 = 0.5363 | 1.80517 | 25.4 |
|  | R9 = −4.7894 | d9 = 1.4648 |  |  |
| L6 | R10 = ∞ | d10 = 0.4000 | 1.51633 | 64.1 |
|  | R11 = ∞ |  |  |  |
| $f_R/f$ | d | $|d \cdot f/f_R^2|$ | v2 |  |
| 2.407 | 0.4073 | 0.0703 | 25.4 |  |

The objective lens system 10 described in the above prescription table is scaled as follows.

| Image Size | Object Distance | Angle of view | Incident Angle |
|---|---|---|---|
| 1.7456Ø mm | 15.00 mm | 120° 12' | −2° 21' |

The objective lens system shown in FIG. 2 is substantially described in Table II.

TABLE II

| Element | Radius of Curvature (mm) | Axial Distance Between Surfaces | $n_d$ | $v_d$ |
|---|---|---|---|---|
| L1 | R1 = ∞ | d1 = 0.5423 | 1.79950 | 44.4 |
|  | R2 = 1.1665 | d2 = 1.0884 |  |  |
| L2 | R3 = 21.3740 | d3 = 2.0381 | 1.80518 | 25.4 |
|  | R4 = ∞ | d4 = 0.0542 |  |  |
| L3 | R5 = ∞ | d5 = 2.0337 | 1.62041 | 60.3 |
|  | R6 = −2.136 | d6 = 1.3558 |  |  |
| L4 | R7 = 3.0220 | d7 = 1.6947 | 1.62041 | 60.3 |
|  | R8 = −2.0079 |  |  |  |
| L5 | R10 = −4.8428 | d8 = 0.5423 | 1.80517 | 25.4 |
|  | R11 = ∞ | d9 = 1.4755 |  |  |
| L6 | R12 = ∞ | d10 = 0.4000 | 1.51633 | 64.1 |

| $f_R/f$ | d | $|d \cdot f/f_R^2|$ | v2 |
|---|---|---|---|
| 3.294 | 0.0244 | 0.0040 | 25.4 |

The objective lens system 10 described in the above prescription table is scaled as follows.

| Image Size | Object Distance | Angle of view | Incident Angle |
|---|---|---|---|
| 1.7464Ø mm | 15.00 mm | 120° 01' | −0° 58' |

As apparent from the Tables I and II, both objective lens system shown in FIGS. 1 and 2 satisfy the conditions (I) and (II).

Figure 3:
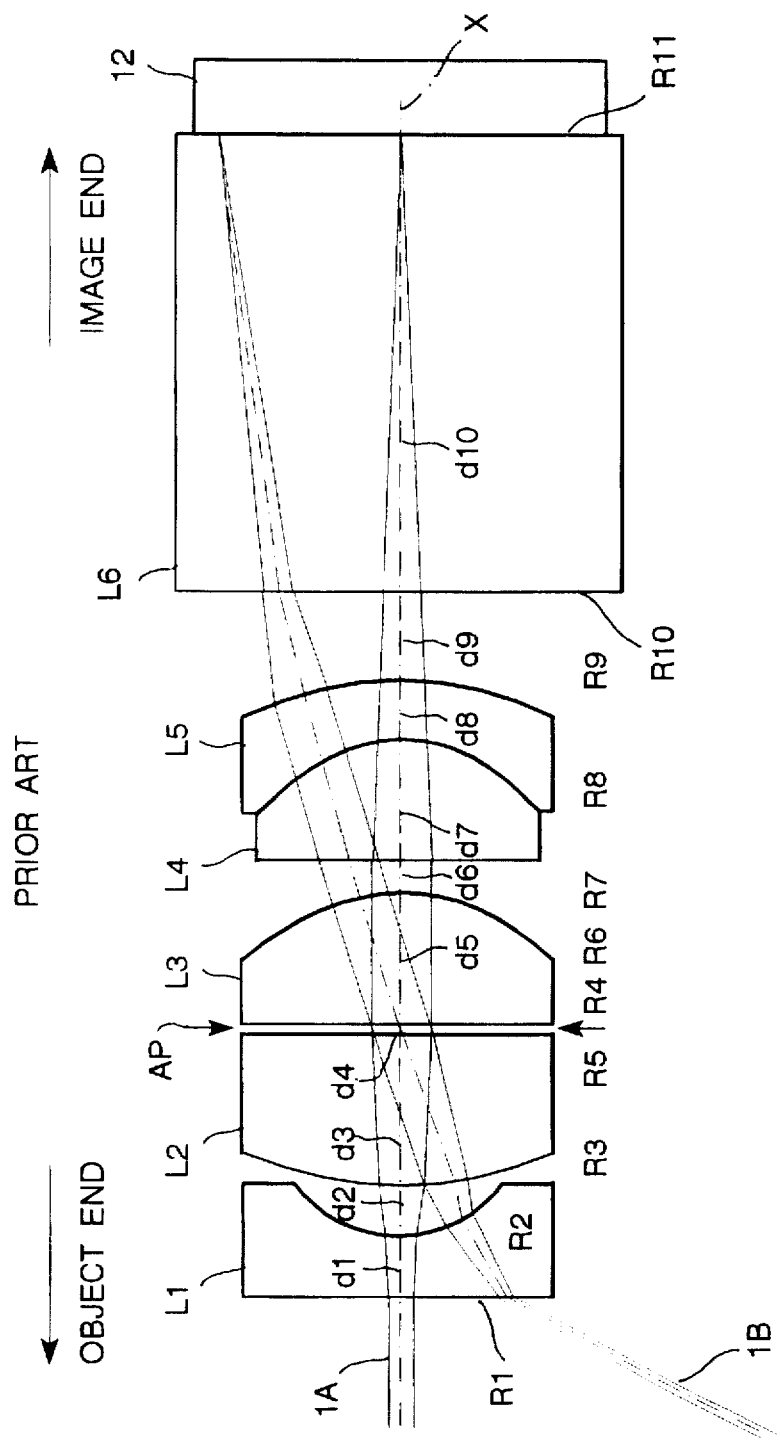
FIG. 3 is a side cross-sectional view of a prior art objective lens system for an endoscope.

The prior art objective lens shown in FIG. 3 is described in Table III for reference.

TABLE III
(Prior Art)

| Element | Radius of Curvature (mm) | Axial Distance Between Surfaces | $n_d$ | v |
|---|---|---|---|---|
| 1 L1 | R1 = ∞ | d1 = 0.3133 | 1.81550 | 44.4 |
|  | R2 = 0.5506 | d2 = 0.2506 |  |  |
| L2 | R3 = 2.3066 | d3 = 0.7911 | 1.80518 | 25.4 |
|  | R4 = ∞ | d4 = 0.0392 |  |  |
| L3 | R5 = ∞ | d5 = 0.6579 | 1.71300 | 53.9 |
|  | R6 = −1.0824 | d6 = 0.1801 |  |  |
| L4 | R7 = ∞ | d7 = 0.8224 | 1.62041 | 60.3 |
|  | R8 = −0.8263 |  |  |  |

TABLE III-continued

| Element | Radius of Curvature | Axial Distance | $n_d$ | v |
|---|---|---|---|---|
| L5 | R10 = −1.6009 | d8 = 0.3133 | 1.80517 | 25.4 |
|  | R11 = ∞ | d9 = 0.4627 |  |  |
| L6 | R12 = ∞ | d10 = 2.3497 | 1.55919 | 64.1 |

| $f_R/f$ | d | $|d \cdot f/f_R^2|$ | v2 |
|---|---|---|---|
| 1.308 | 0.5407 | 0.3162 | 25.4 |

The objective lens system 10 described in the above prescription table is scaled as follows.

| Image Size | Object Distance | Angle of view | Incident Angle |
|---|---|---|---|
| 1.8560° mm | 15.00 mm | 120° 02' | 11° 5' |

The conditions (I) and (II) are not satisfied by the prior art objective lens system described in Table III.

As described above, because the objective lens of the invention forms a telecentric optical system which enables principal rays to emanate in parallel with the optical axis, light rays enters the end surface of the optical fiber bundle 3 at small incident angles. Accordingly, the image transfer optical fiber bundle type of endoscopes in which the objective lens system is installed form a bright and clear image. Together, because glass for the second lens element L2 has an Abbe number less than 45.0, the objective lens system 10 provides well balanced longitudinal and lateral chromatic aberrations.

It may thus bee seen that the objects of the invention set forth as well as those made apparent from the foregoing description are efficiently attained. Embodiments of the invention have been set forth for the purposes of disclosure, however, modifications and variants to the disclosed embodiments of the invention as well as other embodiments thereof may occur to those skilled in the art. Accordingly, the appended claims are intended to cover all embodiments of the invention and modifications and variants to the enclosed embodiments which do not depart from the spirit and scope of the invention.

What is claimed is:

1. An objective lens system for an endoscope having an image transfer optical fiber bundle, which comprises from the object end to the image end a negative powered first lens element L1 having a concave image side surface, a positive powered second lens element L2 having a radius of curvature greater on an image side than on an object side, a positive powered third lens element L3 having a radius of curvature greater on the object side than on the image side, a positive powered doublet lens component comprising fourth lens element L4 and fifth lens element L5, and an aperture diaphragm interposed between the second lens element and the third lens element, said objective lens system satisfying the following relations:

$$|d \cdot f/f_R^2| < 0.11$$

$$v2 < 45.0$$

where f is the equivalent focal length of the entire objective lens system, $f_R$ is the equivalent focal length of the rear lens group including the third, fourth and fifth lens elements; d is the axial distance between the aperture diaphragm and the front focal point of the rear lens group, and v2 is the Abbe number of glass for the second lens element.

2. An objective lens system as defined in claim 1, wherein said first lens element consists of a plano-concave lens.

3. An objective lens system as defined in claim 1, wherein said second lens element consists of a plano-convex lens.

4. An objective lens system as defined in claim 1, wherein said third lens element consists of a plano-convex lens.

5. An objective lens system as defined in claim 1, wherein said fourth lens element consists of a bi-convex lens having a radius of curvature greater on the image side than on the object side.

6. An objective lens system as defined in claim 1, wherein said fifth lens element consists of a negative powered meniscus lens having a convex image side surface.

7. An objective lens system as defined in claim 1 described substantially as follows:

| Element | Radius of Curvature (mm) | Axial Distance Between Surfaces | $n_d$ | $V_d$ |
|---|---|---|---|---|
| L1 | R1 = ∞ | d1 = 0.5363 | 1.81550 | 44.4 |
|  | R2 = 1.155 | d2 = 1.3274 |  |  |
| L2 | R3 = 13.8639 | d3 = 1.9174 | 1.80518 | 25.4 |
|  | R4 = ∞ | d4 = 0.0536 |  |  |
| L3 | R5 = ∞ | d5 = 1.5151 | 1.71300 | 53.9 |
|  | R6 = −2.4590 | d6 = 1.2738 |  |  |
| L4 | R7 = 2.9887 | d7 = 1.6760 | 1.62041 | 60.3 |
| L5 | R8 = −1.9857 | d8 = 0.5363 | 1.80517 | 25.4 |
|  | R9 = −4.7894 |  |  |  | where the lens elements L1 to L5 have surfaces R1 to R10, the index of refraction is given by $n_d$, the dispersion measured by the Abbe number is given by $v_d$, and axial distance between each adjacent surfaces is given by d.

8. An objective lens system as defined in claim 1 described substantially as follows:

| Element | Radius of Curvature (mm) | Axial Distance Between Surfaces | $n_d$ | $v_d$ |
|---|---|---|---|---|
| L1 | R1 = ∞ | d1 = 0.5423 | 1.79950 | 44.4 |
|  | R2 = 1.1665 | d2 = 1.0884 |  |  |
| L2 | R3 = 21.3740 | d3 = 2.0381 | 1.80518 | 25.4 |
|  | R4 = ∞ | d4 = 0.0542 |  |  |
| L3 | R5 = ∞ | d5 = 2.0337 | 1.62041 | 60.3 |
|  | R6 = −2.136 | d6 = 1.3558 |  |  |
| L4 | R7 = 3.0220 | d7 = 1.6947 | 1.62041 | 60.3 |
| L5 | R8 = −2.0079 | d9 = 0.5423 | 1.80517 | 25.4 |
|  | R10 = −4.8428 |  |  |  | where the lens elements L1 to L5 have surfaces R1 to R10, the index of refraction is given by $n_d$, the dispersion measured by the Abbe number is given by $v_d$, and axial distance between each adjacent surfaces is given by d.

* * * * *